Sept. 15, 1953 R. D. PITTS 2,651,807
POULTRY SCALDING APPARATUS
Filed Dec. 1, 1949 6 Sheets-Sheet 4

INVENTOR.
ROBERT D. PITTS
BY
Flournoy Corey
ATTORNEY.

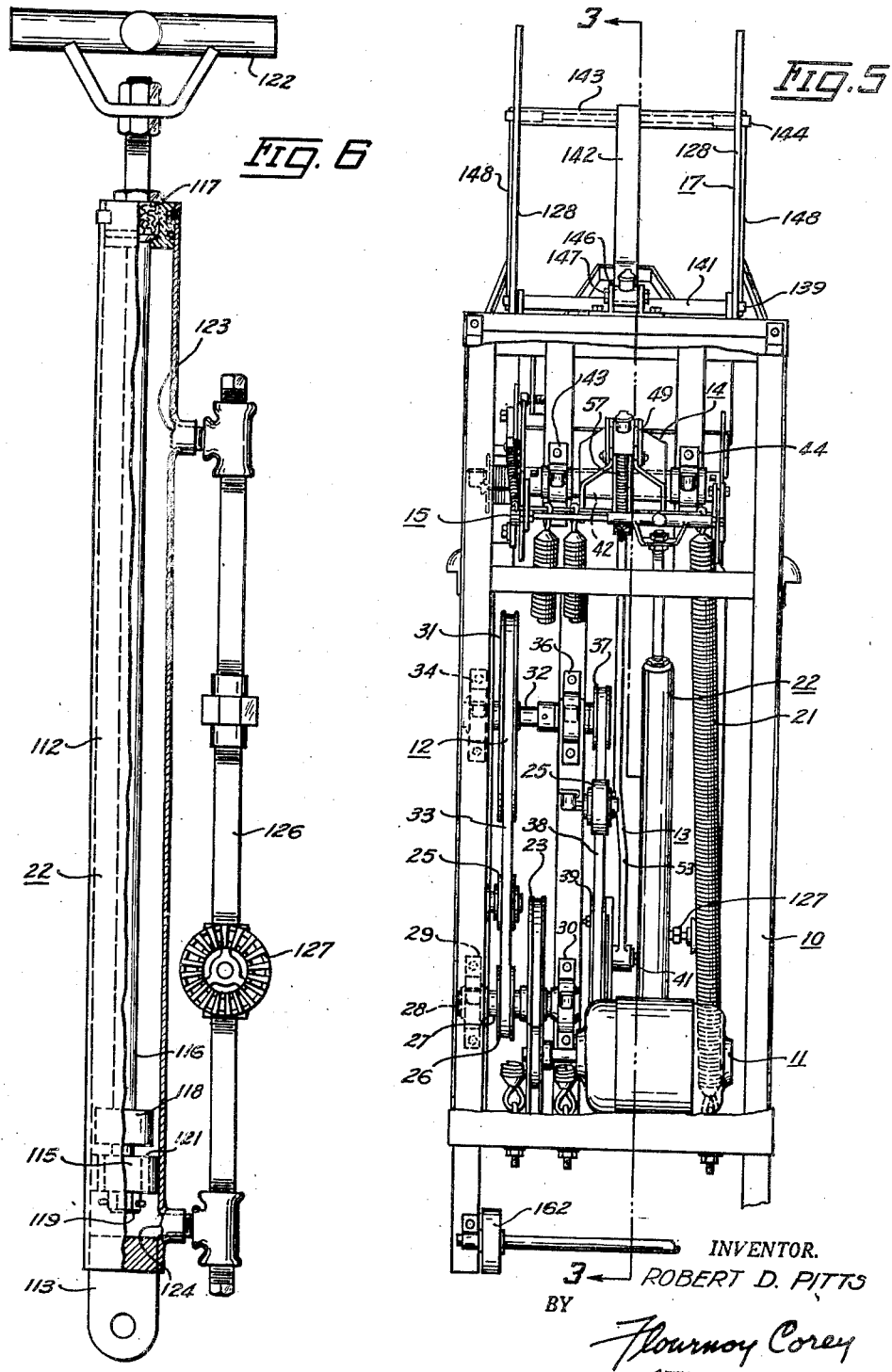

Sept. 15, 1953 R. D. PITTS 2,651,807
POULTRY SCALDING APPARATUS
Filed Dec. 1, 1949 6 Sheets-Sheet 6

INVENTOR.
ROBERT D. PITTS
BY Flournoy Corey
ATTORNEY

Patented Sept. 15, 1953

2,651,807

UNITED STATES PATENT OFFICE 2,651,807

POULTRY SCALDING APPARATUS

Robert D. Pitts, Cedar Rapids, Iowa, assignor to Pickwick Company, Cedar Rapids, Iowa, a corporation of Iowa Application December 1, 1949, Serial No. 130,379

5 Claims. (Cl. 17—11.2)

This invention relates to processing equipment and has particular relation to mechanisms adapted for controlling the immersion and agitation of poultry or the like in scalding or treating baths.

In the processing of poultry, birds are prepared by treating in a bath of hot water preparatory to removal of the feathers by either manual or mechanical means. The step of preparing the birds for plucking or picking is a very important one. Poultry is commonly processed or scalded at temperatures ranging from 125° to 180°. At the higher temperatures the time and method of picking is not critical since birds processed in this manner are commonly sold for immediate consumption, since they do not have the keeping qualities of birds processed at lower temperatures. Regardless of the temperature at which poultry is processed, however, the temperature is important but the time of immersion and the manner in which the birds were immersed or treated is very important. To secure as nearly a perfect scald as possible, it is necessary that the birds be supported in such manner as to prevent them from lying or resting against one another which would prevent complete scalding. It is necessary that all parts of each bird be thoroughly wetted at all times during the scalding process. It is also necessary for best results, that the birds actually be flushed with water and means provided for thoroughly and continuously ruffling the feathers of the bird to permit the scalding or treating fluid to reach the base of each feather.

It is accordingly, a primary object of my invention, to provide a device which will accurately and efficiently control the scalding operation of poultry, preparatory to picking.

Another primary object of my invention is the provision of improved means for controlling and imparting a better and more thorough scald to poultry being processed.

Another primary object of my invention is the provision of an improved means and method for handling birds during the steps of the process preparatory to picking or de-feathering.

A still further object of my invention is the provision, in a device of the character described, of an improved timing mechanism.

Still another important object of my invention is the provision of a device of this general character which is adapted to be quickly placed in operating position and readily adaptable for use in connection with scalding vats of various sizes and shapes.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

In said drawings:

Figure 5 is a view in rear elevation of the same device with the rear panel removed and other parts broken away to better illustrate the interior structure.

Figure 6 is a view partly in elevation and partly in section, illustrating the structure of the dashpot mechanism of the device.

Figure 1:
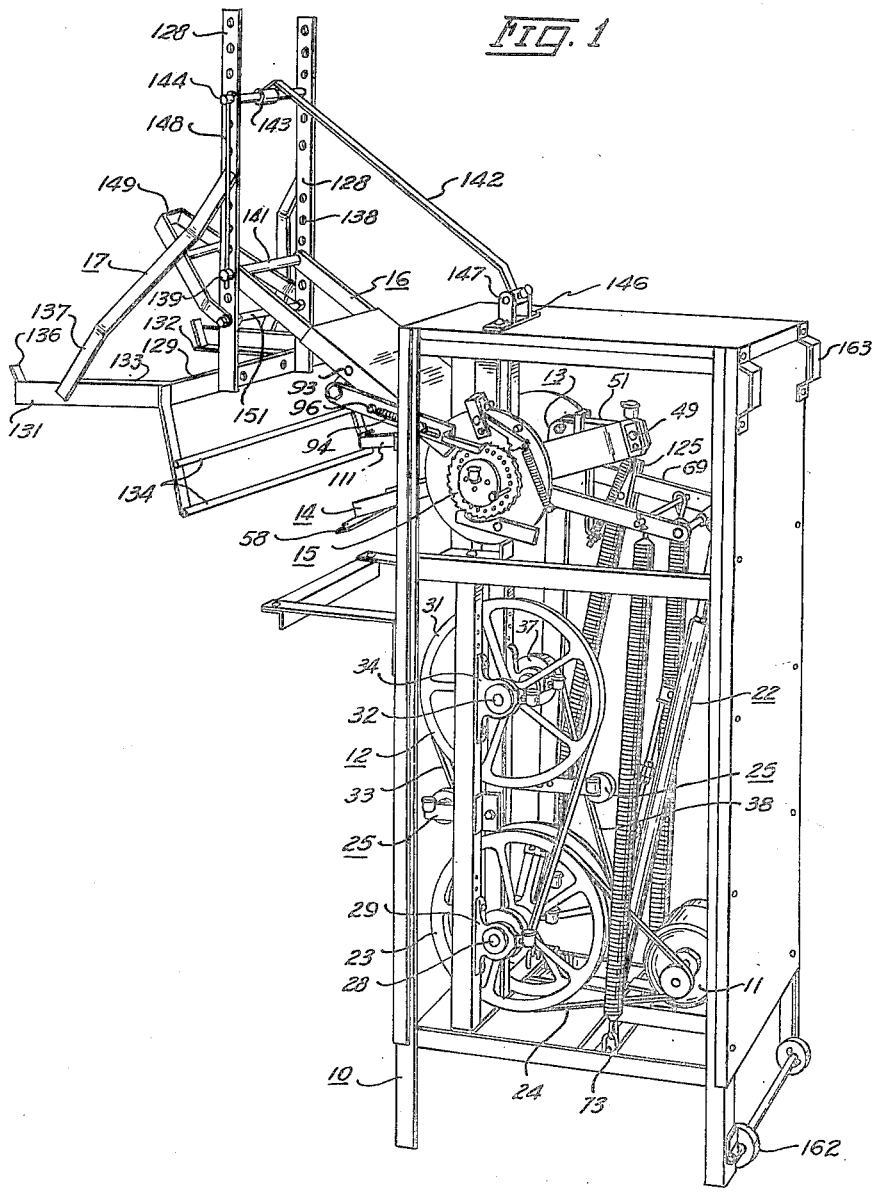
Figure 1 is a view in perspective illustrating a device constructed in accordance with a preferred embodiment of my invention. The right side panel of the device has been removed to better show the structure.

Referring now to these drawings and in particular to Figures 1 through 5 thereof, in which I have shown a main frame at 10 having mounted thereon a motor 11 driving a speed reduction mechanism illustrated generally at 12. A pitman assembly illustrated generally at 13 and reciprocated by the speed reduction mechanism 12 serves to rock or oscillate the drive arm assembly 14, and that member is engageable to the dunking arm 16 and disengageable therefrom by means of the timing mechanism indicated generally at 15. Pivotally supported by the outer end of the dunking arm assembly 16, is a shackle support assembly 17, adapted to receive and secure one or more poultry shackles such as those indicated generally at 18, for immersion of the birds 19 into a vat 20 containing water at the proper scalding temperature, the temperature of such water being preferably thermostatically controlled.

Figure 2:
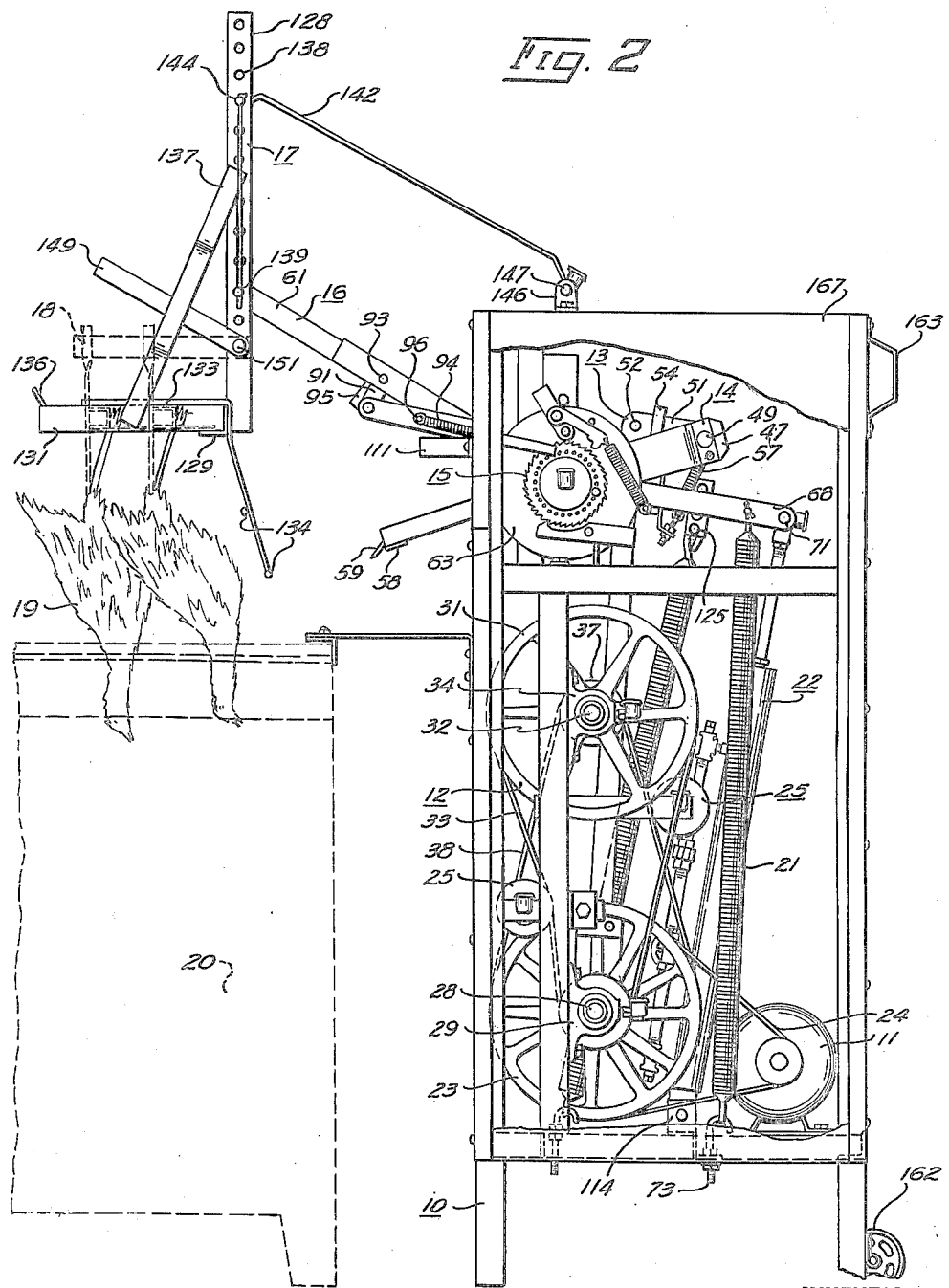
Figure 2 is a view in right side elevation of the device shown in Figure 1, and illustrates the manner in which birds are hung from shackles on the device for immersion in a treating vat.

In general the operation of the device is as follows: the speed reduction mechanism 12, driven by the electric motor 11, reduces the speed at its output shaft to approximately 30 revolutions per minute. This output shaft, as will be described later, includes a crank member operatively connected with the lower end of the pitman assembly 13, the upper end of the pitman being pivotally connected to the drive arm assembly 14. This member therefore, oscillates at its outer end. Poultry being processed, is placed in shackles 18, and killed and bled before being placed in the shackle support assembly 17. This is accomplished with the shackle support 17 out of water as illustrated in Figure 2. The entire shackle support assembly is then depressed manually to the position shown by full lines in Figure 3. The dunking arm 16, is automatically latched into engagement with the drive arm 14 and continues to oscillate vertically with that member to thus immerse the poultry in the water in the scalding vat 20. At the end of the predetermined scalding period, the timing mechanism 15 acts to release the latching mechanism and the entire shackle bar support, along with the shackles and poultry, is lifted out of the water by action of the extension coil springs, 21. The speed of lift of the shackle support assembly out of the water, due to the action of the extension springs, is under the control of the dashpot assembly indicated generally at 22.

The specific structure of the device will now be taken up in greater detail.

The speed reduction mechanism may take any desired form but, in the embodiment shown, the electric motor 11 drives a large sheave 23 through a V belt 24, the large sheave being mounted, along with a small sheave 26, as shown in Figure 5, on an idler sleeve 27 said sleeve being mounted for free rotation on the crank shaft 28. The crank shaft is mounted for rotation in bearings 29 and 30. The small sheave 26 drives a large sheave 31, affixed to the top cross shaft 32, by means of V belt 33, and the top shaft 32 is mounted for rotation in the upper bearings 34 and 36. The inner end of the upper cross shaft 32 carries a small sheave 37 adapted to transmit power thru the V belt 38 to the large sheave 39 affixed to the inner end of the crank shaft 28. Idlers 25 maintain the belts at the proper tension. The lower end of the pitman assembly 13 is journalled on the crank pin 41, provided on the inner end of the crank shaft 28.

A timer shaft 42, mounted for rotation in the bearings 43 and 44, provides for mounting the drive arm assembly 14 in the space between the bearings 43 and 44. This drive arm assembly 14 comprises a pair of spaced plates or drive arms 46 and 47 attached to the sleeve 48 said sleeve being mounted on the timer shaft 42. The inner ends of the drive arm are apertured for the reception of the pivot pin 49. A pitman pivot arm 51 operatively connects the pin 49 and the end of the pitman arm 53 by means of another pivot pin 52, the pivoting action of the pitman pivot arm 51 being limited by the stop 54. The pitman pivot arm, however, is normally held in the position illustrated at Figure 3 against the stop 56 by means of the extension coil spring 57. The outer ends of the drive arms 46 and 47 carry a cross bar 58 which in turn carries the removable latch plate 59.

The dunking arm 16 includes a pair of spaced bars 61 and 62, secured to discs 63 and 64 respectively, said discs being mounted and secured by means of collars 67, adjacent the ends of the timer shaft 42. Rearward extensions 68 and 69, of the dunker arm assembly, are attached together at their rear end by the cross tie 71. The springs 21 are attached to the rear end of the extension members 68 and 69 by means of the spring mounting rod 72. The lower ends of the springs 21 are anchored to the lower portion of the frame 10 by means of J bolts 73.

The timing mechanism 15 is mounted upon the disc 63 forming part of the dunking arm.

Figure 7:
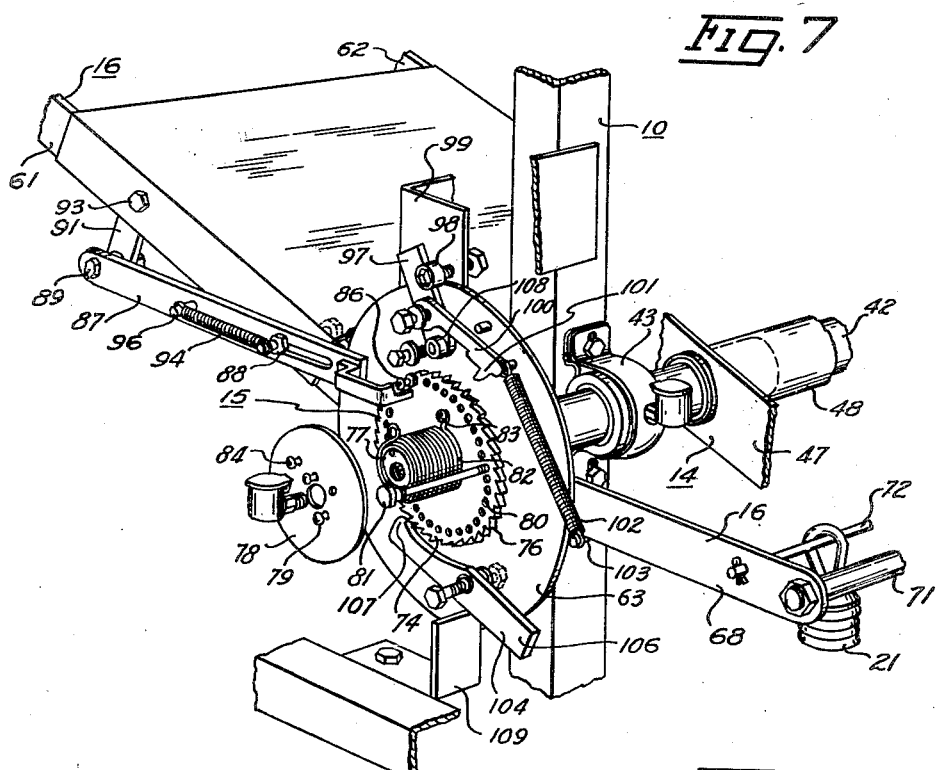
Figure 7 is a view in perspective illustrating the parts of the timing mechanism of my device in exploded relation.

The detailed structure of the timing mechanism may best be understood from an examination of Figure 7. The circular timing gear 74 is provided with ratchet teeth 76 about its periphery and its hub 77 is bushed for free rotation on the timer shaft 42. A timer shield 78 is secured by means of screw 79 to the end of the timer shaft so as to retain the timer disc.

A plurality of radially spaced apertures 80 are provided in the face of the timer disc for the reception of the timer pin 81. This timer pin may be placed in any one of these holes to secure a scalding cycle of any desired length as will be further explained hereinafter.

A torsion spring 82, encircling the hub of the timer disc, is secured to the disc by a screw, as at 83, and its opposite end is secured, by means of a screw 84, to the timer shield 78. This torsion spring is wound up so as to tend to rotate the timer disc in a clockwise direction, the rotation of the timer disc being limited by the stop 86 which engages behind the hooked end of the latch release bar 87.

This latch release bar is slideably mounted on the latch slide pin 88, the outer end of the latch release bar being pivotally connected, as at 89, to the lever arm 91 which comprises part of the latch bar assembly 90.

Figure 3:
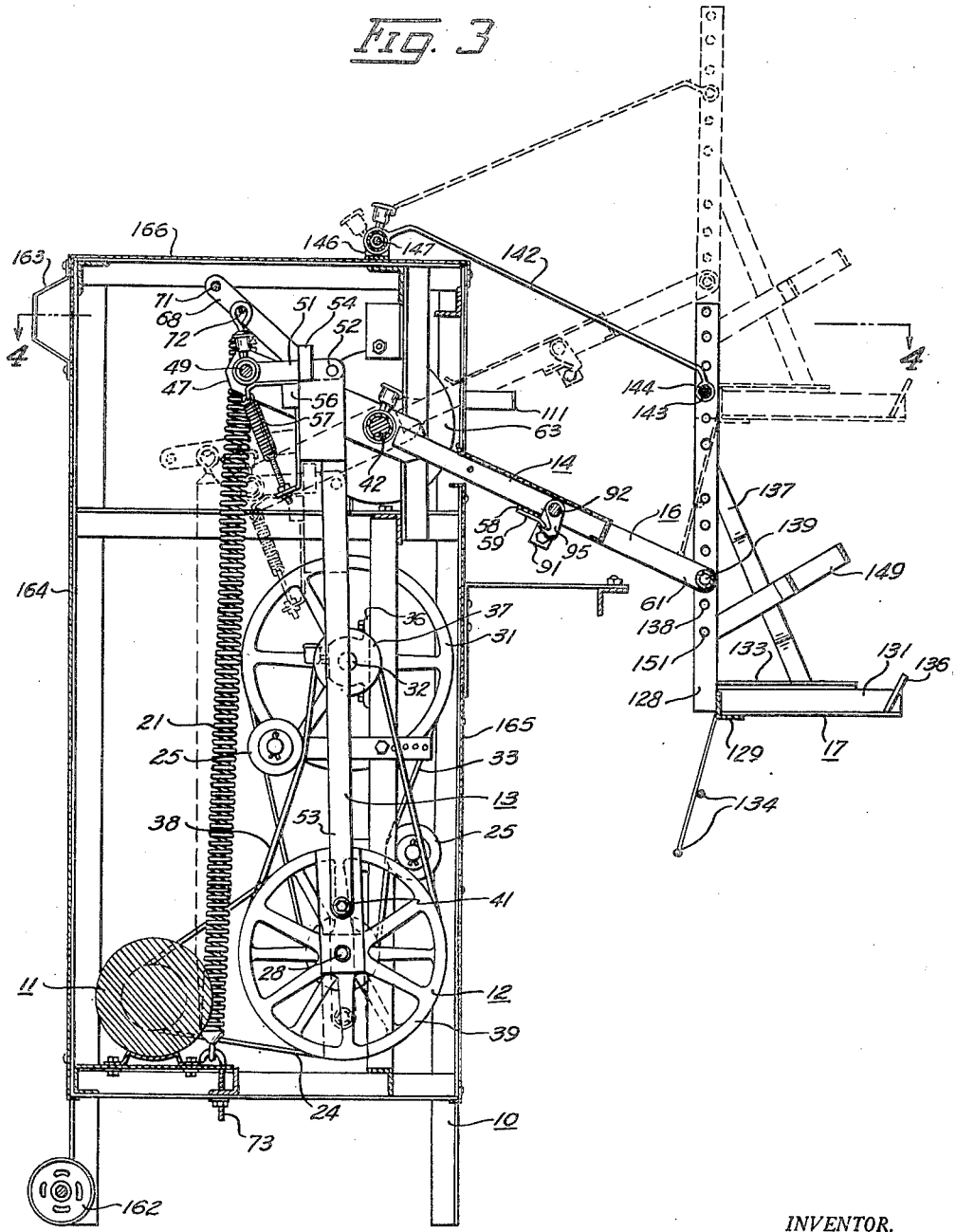
Figure 3 is a view in vertical longitudinal section taken along the line 3—3 of Figure 5.
Figure 4:
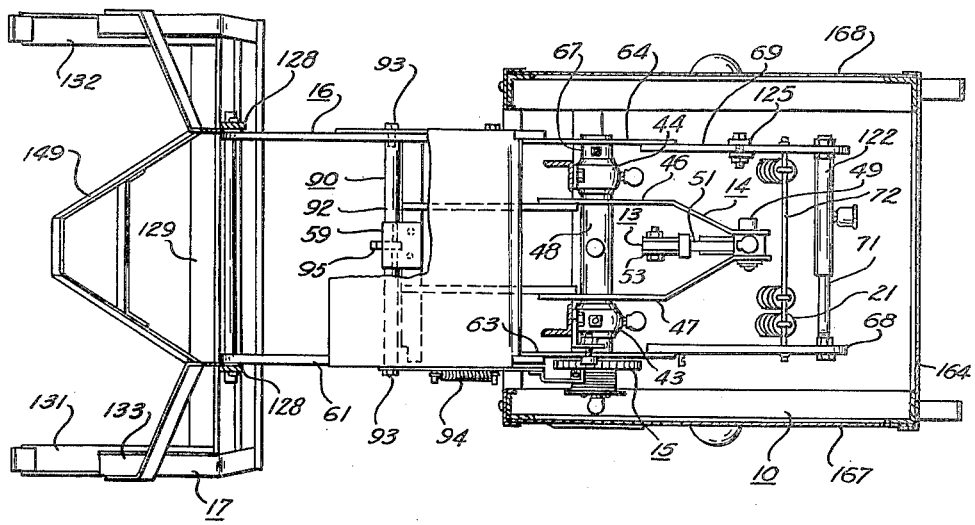
Figure 4 is a view in horizontal section taken along the line 4—4 of Figure 3.

The latch bar assembly, best shown in Figures 3 and 4, comprises a cross shaft 92 rotatable between the pivots 93—93 and between the dunking arms 61 and 62. The lever arm 91 is affixed to this cross shaft 92 at one end thereof, a hook-shaped latch 95 being affixed to the cross shaft near its center. The latch return spring 94 is mounted between the latch slide pin 88 and a pin 96 mounted on the side of the latch release bar. It should now be understood that this spring 94 will urge the latch into engagement with the latch plate 59 when the shackle supports and the dunking arm are forced downward manually until these two members contact each other. Release of the latching mechanism is caused by rotation of the timing disc 74 in a counter-clockwise direction until the timer pin 81 contacts the end of the hooked portion of the latch release bar 87. This action is effected by a feeding mechanism which will now be described.

A feeding dog lever 97 is pivotally mounted on the side of the mounting disc 63, the upper free end of this member being so positioned as to be engaged by the timer trip pin 98, which member is mounted on an extension 99 of the main frame 10. A timer feeding dog 100 is pivotally attached to the feeding dog lever 97 and its free end is provided with a tooth 101 adapted to drop into place and engage a single tooth of the timer disc 74.

The feeding dog spring 102 is attached to the end of the feeding dog 100 and anchored as at 103 to the dunker arm rear extension 68. Thus vertical oscillation of the dunker arm assembly 16 causes the feeding dog lever 97 to engage the trip pin 98 as the dunker arm moves upwardly. The feeding dog lever thus causes the feeding dog, when engaged with one of the teeth of the timing disc, to rotate the timing disc in a counter-clockwise direction. The timing disc is caused to rotate one tooth for each oscillation of the dunking arm and return or reverse rotation of the timing disc is prevented by the holding dog 104 pivotally mounted on the disc 63 adjacent the under side of the timing disc. The weighted end 106 of this holding dog is sufficient to urge the hooked or toothed end 107 into engagement with the timing disc.

The timing pin 81 will, upon contacting the end of the latch release bar 87, cause that member to disengage the latch 95 from the latch plate 59 to thus permit the extension spring 21 to lift the shackle support and the poultry out of the scalding vat. The latch will normally be released at the upper end of the operating stroke of the device. However, when so released, the dunking arm will continue to rise so as to lift the birds entirely out of the water. In so doing, the feeding dog lever will continue to move the feeding dog until the underside of the feeding dog engages the bearing sleeve 108. When this happens the feeding dog will be lifted out of engagement with the timing gear. At approximately the same time the weighted end 106 of the holding dog 104 will have moved downward sufficiently to contact the holding dog lifter 109 which member is attached to the main frame 10. Engagement of the holding dog with the holding dog lifter in this manner disengages the holding dog from the timing gear and the torsion spring 82 causes that member to return to starting position, the stop 86 coming to rest against the inner side of the hooked portion of the latch release bar 87. The timing mechanism is thus automatically readied for a new sequence of operation.

It is preferable, in starting the device, that the dunking arm be moved down into such a position that the latch release bar pin 96 is brought opposite an indicating pointer 111 mounted on the front of the frame. When so positioned the latch plate 59 will engage the latching mechanism upon its next upward stroke. However, if the dunking arm is inadvertently depressed too far, the shock between the dunking arm and the drive arm is absorbed by the spring 57, and that member is of sufficient strength to prevent stretching thereof under normal operating condition.

The dash pot 22 is best illustrated in Figure 6 and comprises a cylinder 112 plugged and provided with an apertured ear 113 at its lower end, this end being pivotally mounted in a bracket 114 on the bottom of the main frame and as best shown in Figure 2. A piston 115 slideable longitudinally within the cylinder is loosely mounted for limited longitudinal motion on the end of a push rod 116 and this member extends upwardly thru a packing gland 117 in the top of the cylinder. The piston is retained on the end of the push rod by means of the valve plate 118, of lesser diameter than the cylinder, and by the nut 119.

A plurality of valve ports 121 extend through the piston and are so positioned as to be closed by the valve plate 118 when the two members are in contact, that is, when the piston is being forced downwardly into the cylinder. A bushed sleeve 122 attached to the top of the push rod, is pivotally mounted upon the dunker arm cross tie 71. Ports at the upper and lower ends of the cylinder 112 permit a hydraulic fluid within the cylinder to be circulated through the external by-pass conduit 126 and controlled by the valve 127.

The operation of this dash pot or snubber is as follows: the extension springs 21, when lifting a batch of poultry out of the water, have a tendency to jerk the birds up out of the water and, if the shackle bar were lightly loaded, this jerking would become objectionable. Upon each upward stroke of the dunking arm 16, the piston 115 is forced downwardly in the cylinder, closing the ports 121 and forcing fluid from the lower end of the cylinder into the upper end thereof through the by-pass. The speed of operation of the dash pot may therefore be controlled by opening or closing the valve 127 as necessary. Upward movement of the dunking arm is unrestricted by the dash pot since the piston 115 immediately drops away from the valve plate 118 thus opening the ports 121 to permit free passage of fluid therethrough.

For practical purposes, the tension springs 21 are preferably two or more in number, one of which may be adjustable along the dunking arm rear extension 69 as at 125 to permit regulation of the spring tension.

The shackle support assembly 17 comprises a pair of vertically positioned, horizontally spaced bars 128 secured together at their lower ends by a cross bar 129 to the ends of which are secured a pair of horizontally spaced, forwardly extending angle iron slide members 131 and 132. The rear portion of the top of each of these slide members is boxed in by a plate 133, the plate also extending rearwardly and downwardly below the cross bar 129 so as to support a pair of immersion bars 134. An inclined stop 136 is provided at the forward end of each shackle slide 131 and 132. Braces 137 reinforce the shackle slides.

The upright bars 128 are provided with a plurality of openings 138 which may be pivotally and selectively mounted on the forward end of the dunking arm 16 by means of the pivot shaft 139 the forward ends of the dunking arms 61 and 62 being joined by a sleeve 141 adapted to receive the pivot shaft 139.

The upright members 128 of the shackle support are retained in a vertical position during operation by means of the pivot arm 142 having a sleeve 143 at its outer end pivotally mounted on a second pivot shaft 144, that member being selectively receivable in the apertures 138 in the upper end of the upright bars. The inner end of the pivot arm 142 is pivotally engaged to the main frame 10 by means of the bracket 146 and pivot pin 147. Locking rods 148 serve to secure the pivot shafts 139 and 144 in position.

The shackle lock 149 is hingedly mounted on these upright members 128 of the shackle support, the pivot rod 151 having means for frictionally supporting the shackle lock in raised position when shackles are being placed or removed.

Figure 8:
Figure 8 is a view in perspective illustrating a poultry shackle adapted for use with my device.

The poultry shackle indicated at 18 and best illustrated in Figure 8 is best adapted for the handling of small and medium size birds. This shackle includes a bar 152 of angle iron or the like having a hooked handle member 153. An immersion bar 154 also secured to the rear of the angle and to the lower end of the handle 153 will be explained in greater detail hereinafter. A plurality of generally U shaped spring clips 156 are secured to the angle 152 in such manner that their ends are free to move to a limited extent, all in accordance with common practice.

Birds are mounted in these shackles with their feet clipped between adjacent spring clips 156, head downward and with breasts away from the immersion bar 154 as best illustrated in Figure 2. The shackle with poultry is dropped into place on the shackle slides 131 and 132 with the breasts of the birds toward the immersion bar 134 of the shackle support and the shackle is then pushed rearwardly so as to lie under the plates 133. The shackles 18 are provided with squared end portions 157 so as to permit the shackles to slide easily under these retainer plates 133 and, in operation of this mechanism, the retainer plates 133 prevent the shackles from rising out of the shackle support because of the buoyancy of the birds when they are immersed in the water.

It should be noted at this time that, when the birds are being immersed in the water, this tendency of the birds to float, particularly before the feathers are wetted, must be counteracted. When positioned in the shackles as illustrated in Figure 2 the shackle immersion bar 154 prevents the knee or hock of the birds from floating forwardly and upwardly away from the shackle and it is possible for the body of the bird to hinge rearwardly only. This, however, is limited by the shackle support immersion bars 134.

Figure 9:
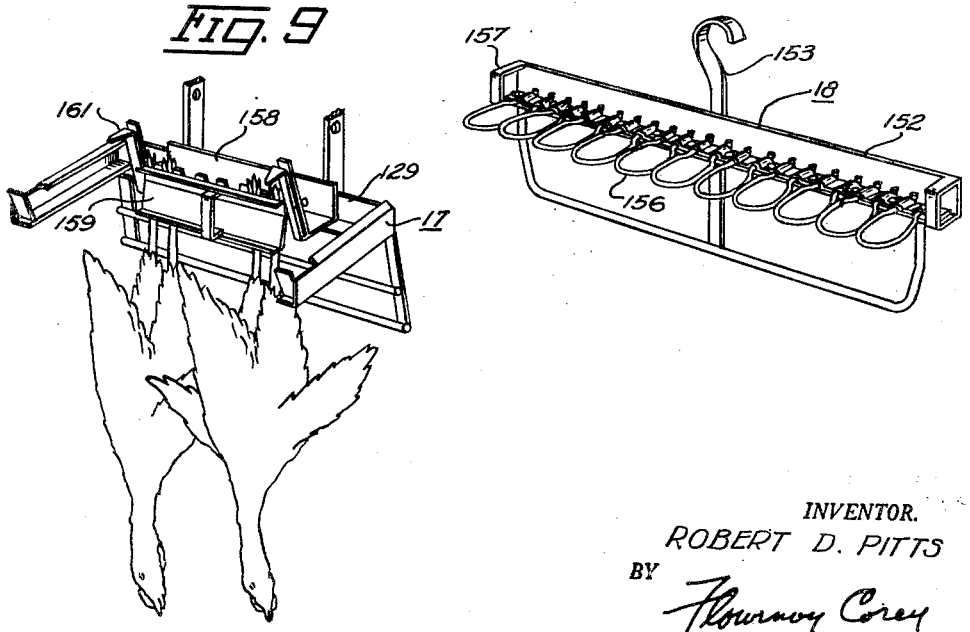
Figure 9 is a view in perspective of a shackle adapted for hanging or supporting heavy birds such as turkeys, in my improved processing device.

A different type of shackle is provided for large sized birds such as turkeys, and as illustrated in Figure 9. This shackle includes a plate-like member 158 adapted to be detachably mounted on the cross bar 129 of the shackle support 17. The forward upturned edge of this member 158 is notched to receive the lower legs and feet of large sized birds and a locking plate 159 adapted to be slideably engaged with guides 161, so as to lock the legs of the birds in the shackle bar. The lower edge of the locking plate 159 engages the hock of the bird so as to prevent it from hinging forwardly up out of the water.

The rear legs of the frame are provided with wheels 162, handles 163 also being provided at the upper end of the frame to permit the entire mechanism to be moved into and out of operating position as desired.

The entire mechanism enclosed within the frame work 10 is enclosed by removeable panels 164, 165, 166, 167 and 168.

The structure of the shackle support 17 makes it possible to adapt the device quickly for use with tanks or water heaters of various heights. This is accomplished by simply placing the pivot pins 139 and 144 in different positions in the apertured uprights 128.

Although adaptable for other purposes, a device such as I have herein described is particularly adapted for the processing of poultry.

Once the poultry has been hung in the shackles, killed and bled, and hung on the shackle slides of the machine, the shackle support need only be pressed down into engagement with the driving arm 14. From that point the machine will continue to flush the birds up and down in the water for the period for which the timer is set. At the end of that period, the timer will release the latching mechanism and permit the springs 21 to lift the poultry entirely out of the water.

The manner of supporting and hanging the poultry in the machine and the timing mechanism not only gives the operator complete control over the scalding cycle but causes the birds to be completely and evenly scalded. The immersion bars prevent each bird from floating during a down stroke of the shackle support. During each upstroke of the shackle support however, each bird hangs entirely free from all supporting mechanisms and from each adjacent bird, and therefore water is flushed through the feathers and over the entire surface of the bird in such a manner as to reach down to the base of each individual feather.

Although I have described a specific embodiment of my invention, it is apparent that modifications thereof may be made by those skilled in the art. Such modifications may be made without departing from the spirit and scope of my invention as set forth in the appended claims.

I claim as my invention:

1. In a poultry scalding apparatus, a tank for scalding fluid, a supporting member positioned adjacent said tank, a lever pivotally mounted on said supporting member and extending over said tank, a poultry supporting shackle mounted on said lever and positioned in said tank, said lever being pivotal about an axis normal to the longitudinal axis of said lever extending between said supporting member and said tank, a second lever pivotally mounted on said supporting member and positioned adjacent said first named lever, power means operably associated with said second named lever for continuously reciprocally pivoting said second named lever in a vertical plane, interlocking means mounted on one of said levers for interlocking said levers in engagement, and a releasing means operably associated with said interlocking means for releasing said interlocking means to disengage said levers whereby said first named lever may be released from engagement with said second named lever and moved to a position above said tank with said poultry supporting shackle withdrawn therefrom.

2. In a poultry scalding apparatus, a tank for scalding fluid, a supporting member positioned adjacent said tank, a lever pivotally mounted on said supporting member and extending over said tank, a poultry supporting shackle mounted on said lever and positioned in said tank, said lever being pivotal about an axis normal to the longitudinal axis of said lever extending between said supporting member and said tank, a second lever pivotally mounted on said supporting member and positioned adjacent said first named lever, power means operably associated with said second named lever for continuously reciprocally pivoting said second named lever in a vertical plane, interlocking means mounted on one of said levers for interlocking said levers in engagement, releasing means, operably associated with said interlocking means for releasing said interlocking means to disengage said levers, and biasing means operably associated with said first named lever whereby said first named lever may be released from engagement with said second named lever, and moved to a position above said tank with said poultry supporting shackle withdrawn therefrom.

3. In a poultry scalding apparatus, a tank for scalding fluid, a supporting member positioned adjacent said tank, a lever pivotally mounted on said supporting member and extending over said tank, a poultry supporting shackle mounted on said lever and positioned in said tank, said lever being pivotal about an axis normal to the longitudinal axis of said lever extending between said supporting member and said tank, a second lever pivotally mounted on said supporting member and positioned adjacent said first named lever, power means operably associated with said second named lever for continuously reciprocally pivoting said second named lever in a vertical plane, interlocking means mounted on one of said levers for interlocking said levers in engagement, a releasing means operably associated with said interlocking means for releasing said interlocking means to disengage said levers, and timing means operably associated with said releasing means and operably responsive to the continuously reciprocally pivoting movement of said second named lever whereby said first named lever may be released from engagement with said second named lever at the end of the poultry scalding operation and moved to a position above said tank with said poultry supporting shackle withdrawn therefrom.

4. In a poultry scalding apparatus, a tank for scalding fluid, a supporting frame positioned adjacent said tank, a lever pivotally mounted on said supporting frame and extending over said tank, a poultry supporting shackle mounted on said lever and positioned in said tank, said lever being pivotal in a vertical plane about an axis normal to the longitudinal axis of said lever extending between said frame and said tank, a second lever pivotally mounted on said supporting frame for pivotal movement about the pivotal axis of said first named lever, power means operably associated with said second named lever for continuously reciprocally pivoting said second named lever, interlocking means mounted on one of said levers for interlocking said levers in engagement, and a releasing means operably associated with said interlocking means for releasing said interlocking means to disengage said levers whereby said first named lever may be moved to a position above said tank with said poultry supporting shackle withdrawn therefrom.

5. A poultry scalding apparatus as set forth in claim 4 having a biasing means operably associated with said first named lever for moving said lever to a position above said tank with said shackle withdrawn therefrom, and a timing means operably associated with said interlock releasing means and operably responsive to the continuous reciprocal movement of said second named lever for disengaging said levers at the end of a scalding operation.

ROBERT D. PITTS.

References Cited in the file of this patent

UNITED STATES PATENTS

| Number | Name | Date |
| --- | --- | --- |
| 164,212 | Prouty | June 8, 1875 |
| 806,708 | Perry | Dec. 5, 1905 |
| 957,474 | Parkes | May 10, 1910 |
| 1,596,855 | Pattberg | Aug. 17, 1926 |
| 1,636,872 | Seidel et al. | July 26, 1927 |
| 1,780,869 | Dake | Nov. 4, 1930 |
| 2,110,442 | Kendall | Mar. 8, 1938 |
| 2,310,386 | Blair et al. | Feb. 9, 1943 |
| 2,408,248 | Barber | Sept. 24, 1946 |
| 2,470,409 | Nassivera | May 17, 1949 |
| 2,479,395 | Mumper | Aug. 16, 1949 |

FOREIGN PATENTS

| Number | Country | Date |
| --- | --- | --- |
| 383,133 | France | Dec. 27, 1907 |